E. T. BUSSELL.
Car Spring.

No. 10,280.

Patented Nov. 29, 1853.

UNITED STATES PATENT OFFICE.

ERASTUS T. BUSSELL, OF SHELBYVILLE, INDIANA.

COMBINED INDIA-RUBBER AND STEEL SPRING.

Specification forming part of Letters Patent No. 10,280, dated November 29, 1853; Reissued December 13, 1870, No. 4,202.

*To all whom it may concern:*

Be it known that I, ERASTUS T. BUSSELL, of Shelbyville, in the county of Shelby, State of Indiana, have invented a new and improved combination of vulcanized india-rubber and steel, forming thereby a useful spring for railroad-cars, carriages, buggies, &c.; and I do hereby declare that the following is a full and exact description thereof, reference being had to the accompanying drawings, and to the letters of reference marked thereon, they making a part of this specification, each letter referring to like parts in the various cuts or drawings.

Figure 1:
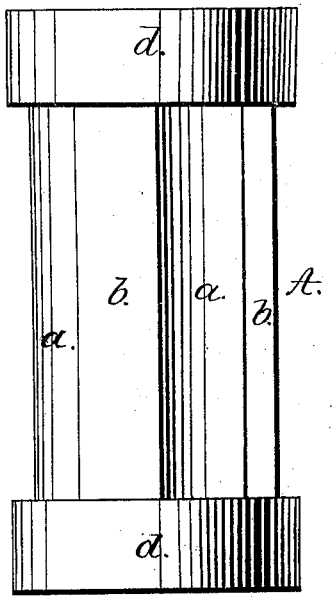
Figure 3:
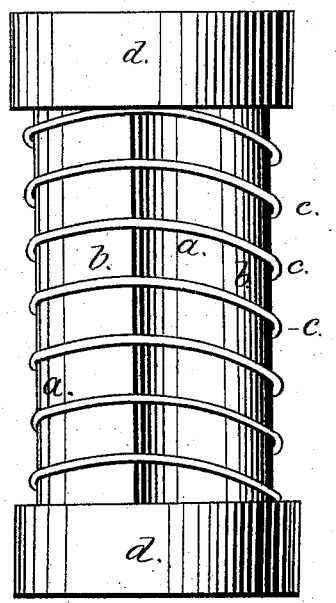
Figure 2:
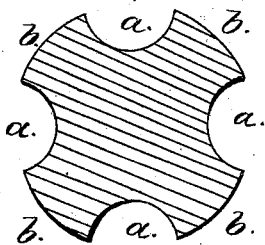

Figure 1 is the fluted column of vulcanized rubber with the metallic cups on each end. Fig. 2 is a transverse section of this column of rubber, and Fig. 3, is a view of the compound spring with the metallic cups on each end.

My invention consists in a combination of vulcanized india-rubber with spiral steel, so arranged that each sustains the other and the good qualities of both are combined so as to make a most perfect spring for elasticity and durability, which is applicable to rail road cars, carriages, buggies, &c.

To enable others skilled in the art to make and use my invention, I will proceed to describe its construction and operation.

Owing to many contingencies that require springs to be of various degrees of stiffness, the diameter of my compound springs must necessarily vary much, but their length is to be graduated by the amount of motion desirable in the spring. For springs for rail road cars, I take a fluted column of vulcanized india rubber A, Fig. 1, about eight inches in diameter and about eight inches long, these conditions depending upon the desirable strength of the spring and the amount of motion required. The column of rubber is fluted by four semiconcavities running longitudinally at equal distances from each other (*a, a, a, a,* the concavities) leaving each intermediate point *b, b, b, b,* equal to the span of each concavity. The depth of each one of these concavities is about one-fifth the diameter of the column of india rubber. For carriage springs the diameter of the rubber is about two inches. I then surround this fluted column of vulcanized rubber with a spiral steel spring *c, c, c,* Fig. 3, the diameter of the wire (constituting the spiral spring) being about one-twentieth that of the column of rubber. I make the spiral spring to touch the points of rubber *b, b, b, b,* thus serving as a self adjusting base upon which the rubber can act centrifugally, each point *b, b, b, b,* being a base to each rubber arch *a, a, a, a*. By this arrangement and combination of vulcanized india-rubber and steel, several important desiderata are filled that have not hitherto been attained by any other spring, namely, it makes, 1st, a sprightly spring, one that responds quickly to any impression made upon it, steel being much more sprightly in its movements than vulcanized india rubber and this element being incorporated into the compound spring; 2d, a durable spring, capable of sustaining burdens to an indefinite length of time, the rubber in this shape maintaining and resuming its normal shape better than in any other, the integrity of the elastic arches *a, a, a, a,* Fig. 2, being most perfect; 3d a strong spring, one that cannot be crushed by any reasonable weight, the steel effectually guarding the rubber against any such calamity, for as the external surface of the rubber is shortened under compression the resisting surface of the spiral steel, in its self adjusting integrity gathers and concentrates its coils around the compressed rubber, thus setting up a herculean barrier, circumscribing the bounds of the rubber within it, and, 4th, a sprightly, durable, and strong spring that will admit of any desirable amount of motion, each concavity (*a, a, a, a,*) serving as a vacuum for its elasticity and contracting volume to find vent in. Vulcanized india-rubber being a durable substance, I thus have in this arrangement a combination of elements in such a way as to make a spring possessing all the good qualities that can reasonably be expected.

The rubber sustains the steel from any violence to its molecules from severe flection, while the steel affords a self adjusting base upon which the rubber can act, at proper intervals, it yielding its sprightliness to the rubber at the same time; and, the points *b, b, b, b,* Fig. 2, being in constant contact with the steel, serves to equalize the power of the rubber, while the concavities *a, a, a, a,* give vent to, and equalize its elasticity.

*d, d, d, d,* are shallow metallic cups in which the ends of the compound rubber and steel spring may rest the application of these springs to vehicles, or anything else, being made by these metallic cups or otherwise as may suit taste and convenience.

I do not claim the surrounding of columns of vulcanized india rubber with detached "bands of metal at the ends or any point between the ends" for springs, nor do I claim originality in the "combination of metallic springs with vulcanized india rubber," as these are the subjects of patents heretofore granted to Fowler M. Ray. But, as all known forms of such springs and combinations are liable to the following objections: 1st, an incapacity for great motion, this depending upon their outer surface being regular and surrounded by "bands of metal" whose diameters are unvarying, together with the incorporating into the center of said rubber springs "helical" or spiral "springs of metal" whose diameters increase with their compression, causing them thus to encroach upon the rubber centrifugally; 2d, the liability of such springs losing their elasticity and becoming worthless from the unequal exercise of their different parts—the stretching to their utmost extent the fibers at the circumference, and this at the expense of their vitality, while the centrifugal action of the "helical spring" within serves further to embarrass it in its movements, so that a large mass of the rubber is rendered partially inert by being confined between the almost lifeless circumferential rubber and the centrifugally acting helical spring—the rubber thus circumstanced may properly be compared to an elastic arch with the burden or force applied to its concave side without any base upon which to rest save that of its own external fibers; and, 3d, their great liability of being crushed by an overload for the want of a continuous metallic support externally. And, inasmuch as fluting a column of vulcanized india rubber longitudinally on its external surface, and surrounding it by a spiral steel spring substantially as above described, produces a spring susceptible of much greater motion and much greater freedom in all its movements than any of the foregoing forms—the fluted concavities giving vent to the compressed rubber, and the diameter of the spiral spring increasing with its compression, thus yielding to and allowing the greater freedom to the expanding rubber within. The circumference of the rubber mass being a series of elastic arches, brings the radial point of expansion almost equally near the surface in every direction, and the self adjusting base afforded to each arch in the spiral spring that surrounds them, gives to them the capacity of multiplying strength in use and of promptly resuming their normal shape—the rubber, thus circumstanced, in contrast with other forms of rubber car springs—is a series of elastic arches with the force applied to their convex sides while their bases rest upon an accommodating metallic surface, which enables them to endure without loss of vitality almost indefinitely. And, finally, inasmuch as the continuous coil of steel on the outside of the rubber approximates a solid broad band when an overload is put upon the springs, thus guarding the rubber effectually against any mishap that other rubber springs are liable to. Therefore, what I claim as my invention, is not the surrounding a column of vulcanized india rubber with a helical spring, as that is the subject of a patent granted to F. M. Ray, but

What I claim and desire to secure by Letters Patent, is—

The fluting a column of vulcanized india rubber longitudinally, and then so surrounding it with the helical spring—mine being an improvement upon Ray's spring.

E. T. BUSSELL.

Witnesses:
    C. T. JONES,
    H. BIGGERS.

[FIRST PRINTED 1913.]